United States Patent [19]
Miyamoto et al.

[11] Patent Number: 5,684,552
[45] Date of Patent: Nov. 4, 1997

[54] COLOR LIQUID CRYSTAL DISPLAY HAVING A COLOR FILTER COMPOSED OF MULTILAYER THIN FILMS

[75] Inventors: Tadayoshi Miyamoto, Tenri; Youji Yoshimura; Yutaka Takafuji, both of Nara, all of Japan

[73] Assignee: Sharp Kabushiki Kaisha, Osaka, Japan

[21] Appl. No.: 361,930

[22] Filed: Dec. 21, 1994

[30] Foreign Application Priority Data

Dec. 24, 1993 [JP] Japan ............................ 5-326426

[51] Int. Cl.⁶ .................................................. G02F 1/1335
[52] U.S. Cl. .................................................. 349/106; 349/107
[58] Field of Search ................. 359/68, 66; 349/106, 349/107, 108, 109

[56] References Cited

U.S. PATENT DOCUMENTS

| | | | |
|---|---|---|---|
| 4,678,285 | 7/1987 | Ohta et al. | 359/54 |
| 4,793,691 | 12/1988 | Enomoto et al. | 359/50 |
| 4,800,375 | 1/1989 | Silverstein et al. | 340/703 |
| 4,946,259 | 8/1990 | Matino et al. | 359/54 |

FOREIGN PATENT DOCUMENTS

| | | | |
|---|---|---|---|
| 54-59957 | 5/1979 | Japan . | |
| 60-107022 | 6/1985 | Japan | 359/68 |
| 60-120398 | 6/1985 | Japan . | |
| 60-218627 | 11/1985 | Japan | 359/68 |
| 61-138233 | 6/1986 | Japan . | |
| 63-234222 | 9/1988 | Japan | 359/68 |
| 4-118620 | 4/1992 | Japan . | |
| 5-142412 | 6/1993 | Japan . | |
| 5323266 | 12/1993 | Japan | 359/68 |

*Primary Examiner*—William L. Sikes
*Assistant Examiner*—James A. Dudek
*Attorney, Agent, or Firm*—David G. Conlin; Brian L. Michaelis

[57] ABSTRACT

A color liquid crystal display for improving the white balance of the color filter by using a multilayer structure of inorganic thin films and preventing a liquid crystal cell from being colored is provided. The spectral transmission characteristic is such that the transmission wavelength area of the G (green) filter is narrowed. For the pixel array having four pixels as a constituent, two pixels for the G filter are arranged diagonally and the remaining two pixels consist of R (red) and B (blue).

8 Claims, 5 Drawing Sheets

| G | B | G | R | G | B | G | R |
|---|---|---|---|---|---|---|---|
| R | G | B | G | R | G | B | G |
| G | R | G | B | G | R | G | B |
| B | G | R | G | B | G | R | G |
| G | B | G | R | G | B | G | R |

COLOR LIQUID CRYSTAL DISPLAY HAVING A COLOR FILTER COMPOSED OF MULTILAYER THIN FILMS

BACKGROUND OF THE INVENTION

1. Field of the Invention

This invention relates to a color liquid crystal display and, more specifically, to a color filter.

2. Description of the Related Art

In performing full-color display by forming a color filter on a liquid crystal display, in general, a pigment distribution method, a chromosomal method, or an interference filter method is used as a technique for fabricating a color filter. Among these methods, the interference filter method using an inorganic thin film is excellent in light resistance and heat resistance and in spectral transmission characteristic. For this reason, much work has gone into the development and putting into practical use of the interference filter method for some time. The use of an interference filter using an inorganic thin film for the liquid crystal panel is disclosed in Japanese Patent Application Laying Open No. 54-59957, for example.

In the case where a pixel array, a delta array, for example, having three pixels as a set is formed using an interference filter fabricated by the multilayer lamination of inorganic thin films, such as shown in FIG. 5, the thickness of the film must be greatly thickened to obtain a spectral transmission characteristic which is excellent in color reproducibility. FIG. 6 shows a sectional view at b—b' in FIG. 5. Each of the symbols is as follows: 11a and 11b are transparent substrates; 12 is a light-blocking film; 13 is a color filter; 14a and 14b are transparent conductive films; 15a and 15b are orientation films; 16 is a liquid crystal layer; and 17a and 17b are polarizing plates. Here, to obtain a spectral transmission characteristic which is excellent in color reproducibility, for example, such as shown in FIG. 7 the lamination of the 29 layers in the R filter must be 1.91 μm thick, that of the 50 layers in the G filter must be 3.73 μm thick, and that of the 29 layers in the B filter must be 2.48 μm thick. Because of this, the difference in stages among the three colors will increase to a maximum of 1.82 μm; accordingly a problem arises, such as stage separation of the transparent conductive film 14b or the adhesion of the orientation film deteriorates. Moreover, the difference among the three colors in the value of dΔn (where d: the thickness of the liquid crystal layer, Δn: the double index of liquid crystal refraction) will increase. In the display using a TN liquid crystal, the photoelectric transfer characteristic will become a significant problem because it depends on the value of dΔn. Moreover, in forming the film, in such a multilayer film configuration, it is difficult to form a precise pattern from the aspects of both technique and cost. Furthermore, in the delta array, the shortcoming arises in that the data bus line will be folded and become complicated, making the numerical aperture of the liquid crystal panel smaller because four pixels are component elements and G filters are arranged diagonally. The wiring for the array of the remaining two colors R and B (FIG. 3) becomes simple, so there is an advantage in that the numerical aperture can be made larger.

Moreover, especially in the case where an interference filter is formed in the above film configuration and four pixels are component elements and G filters are arranged diagonally (FIG. 3), there was a tendency that, although the luminous penetration rate was larger than that of the delta array, the G filter greatly influenced the white balance, pulling it to the G side, as shown in FIG. 8. (FIG. 8: CIE chromaticity of the array of four pixels in the film configuration which is the same as the above delta array) In this way, a problem arises in that the liquid crystal cell is colored, deteriorating the display quality. FIG. 10 illustrates a typical context of filters and liquid crystal display devices, in addition to a plurality of filters, 20A, 20B, 20C, corresponding to respective monochrome LCD panels 22A, 22B, 22C, a projection light source 24 provides a projection light source means.

SUMMARY OF THE INVENTION

An object of the present invention is to solve the problems of the conventional example stated above by providing a pixel array having four pixels as a set and to provide a color liquid crystal display which has a high penetration rate and is excellent in color reproducibility.

Another object of the present invention is to provide a color liquid crystal display which can improve the white balance by narrowing the transmission wavelength area of the G filter and which can prevent the liquid crystal cell from being colored.

Still another object of the present invention is to provide a color liquid crystal display which can reduce the stage difference of three-color interference filters, eliminate the stage separation of the transparent conductive films, and improve the adherence of the orientation film.

Still another object of the present invention is to provide a color liquid crystal display which can simplify the data bus line and make the numerical aperture larger by having four pixels as constituents and arranging G filters diagonally and R and B filters for the remaining two colors.

To attain the above objects, in a liquid crystal display according to the present invention, three-color (R: red, G: green, and B: blue) interference filters are used, and each of the filters of the film components is optimized optically, respectively, by making a pixel array having four pixels as a set. In addition, the half-value width of the transparent spectrum of the G filter in spectral transmission characteristic is 40 nm or less and preferably 30 nm or less.

Moreover, in a liquid crystal display according to the present invention, three-color (R, G, and B) filters are used and the film configuration of each of the filters is optimized optically by making a pixel array having four pixels as a set and an M (magenta) filter is added to a lamp used as a backlight or a projection light source.

Moreover, in a liquid crystal display according to the present invention, three-color (R, G, and B) filters are used and the film configuration of each of the filters is optimized optically by making a pixel array having four pixels as a set and a lamp in which the energy in the transmission wavelength area of the G filter in the emission spectrum of a light source is reduced to one half and used as a backlight or projection light source.

Moreover, in a liquid crystal display according to the present invention, three monochrome panels are used. In a liquid crystal projector having each of the three panels correspond to the R, G, and B interference filters prepared using the above method, the half-value width of the transparent spectrum of the color filter for G corresponding to the G panel is 40 nm or less or preferably 30 nm or less.

The problem of coloring of the liquid crystal cell caused by the displacement of the white balance can be solved by the arrangement mentioned above. In this way, the present invention greatly influences the improvement of display quality of the color liquid crystal display.

BRIEF DESCRIPTION OF THE DRAWINGS

FIG. 10 is a diagram of a typical color liquid crystal projector.

DESCRIPTION OF THE PREFERRED EMBODIMENTS

Figure 2:
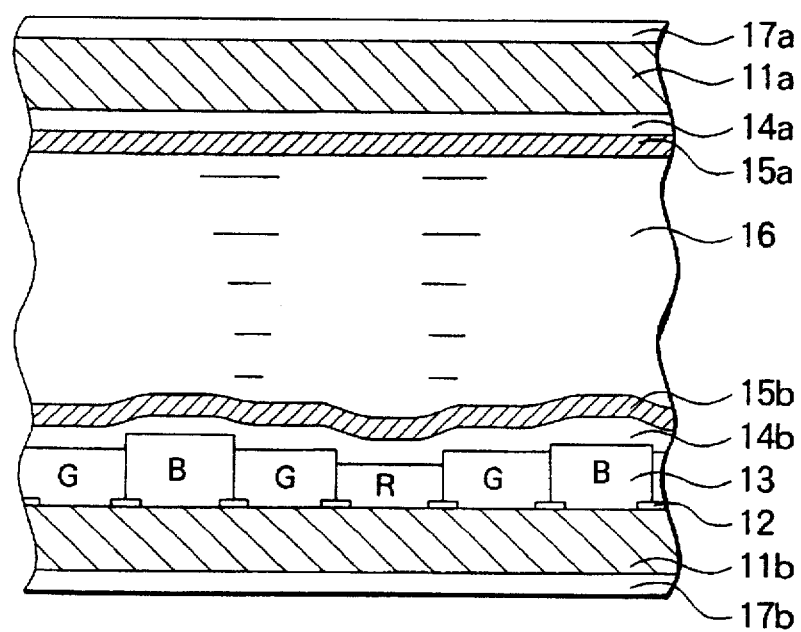
FIG. 2 is a sectional view of a cell of a color liquid crystal display according to the present invention.

First, a method for manufacturing a color liquid crystal display using an interference filter according to the present invention will be described with reference to FIG. 2. FIG. 2 shows a color filter fabricated according to the present invention and a sectional view at a—a' in FIG. 3. Each of the symbols is as follows: 11a and 11b are transparent substrates; 12 is a light-blocking film; 13 is a color filter; 14a and 14b are transparent conductive films; 15a and 15b are orientation films; 16 is a liquid crystal layer; and 17a and 17b are polarizing plates.

Figure 3:
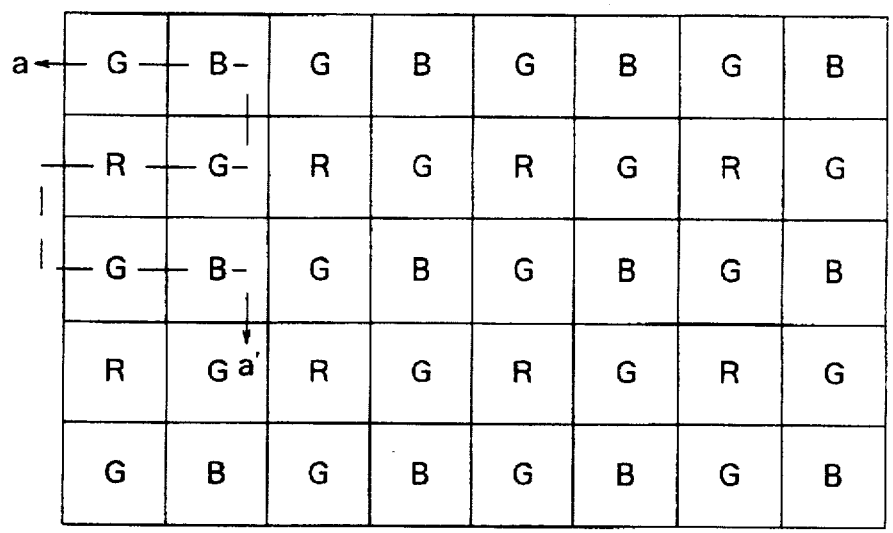
FIG. 3 is a drawing showing the array of each of the R, G, and B filters of the present invention.

The manufacturing method thereof is as follows: First, a light-blocking film 12 is patterned on a glass or quartz transparent substrate 11b by a metal, such as Al, Cu, Cr, or Ni. Then, a color filter 13 is formed on the top. Three-color (R, G, and B) interference filters in which alternate multilayer films are formed by vacuum evaporation are used for the color filter 13. $TiO_2/SiO_2$, which is chemically and mechanically stable, is used for the thin film material this time. On the one hand, the number of film layers for the G filter layer is reduced from 50 layers to 27 layers and the film thickness is reduced from 3.73 μm to 2.11 μm to narrow the transmission wavelength area (leading/trailing cutoff design wavelength) of the G filter. On the other hand, the difference in stages among the three colors is reduced from a maximum of 1.82 μm to 0.55 μm since the film thickness of the R filter is 1.91μm in a 29-layer lamination and that of the B filter is 2.48 μm in a 29-layer lamination. If the difference in stage is this level, flattening can be made easily even with $SiO_2$ lamination. For the color filter 13, patterning is performed by lift-off or dry etchings with respect to each of the R, G, and B filters. In the embodiment, in a pixel array having four (2×2) pixels as a set as shown in FIG. 3, a pattern is formed by arranging two pixels for the G filter in one diagonal direction and the other two pixels for the R and B filters in the other diagonal direction. Moreover, two colors (G and R or G and B) are arranged alternately and repeatedly in a line or in a row.

Next, a transparent conductive film 14b, such as ITO, is formed on the top of the color filter 13 formed in this way and then an orientation film 15b is formed on top of it. As an orientation film, an organic material, such as polyimide or polyvinyl alcohol, is applied by a spinner or printing. Then, the surface is rubbed for use. Since the difference in the stage of the color filter is reduced in the present invention, the separation caused by the difference in stages will not occur in the transparent conductive film. The adherence of the orientation film will not be made worse by the difference in stages. Moreover, a transparent conductive film 14a and an orientation film 15a are also formed on the other transparent substrate 2a using the same method as described above. Two transparent substrates are laminated and then liquid crystal 16 is sealed in.

Polarizing plates 17a and 17b are arranged in parallel or perpendicular to the rubbing direction of the orientation film so that their polarizing axes are parallel to each other.

Figures 8, 9:
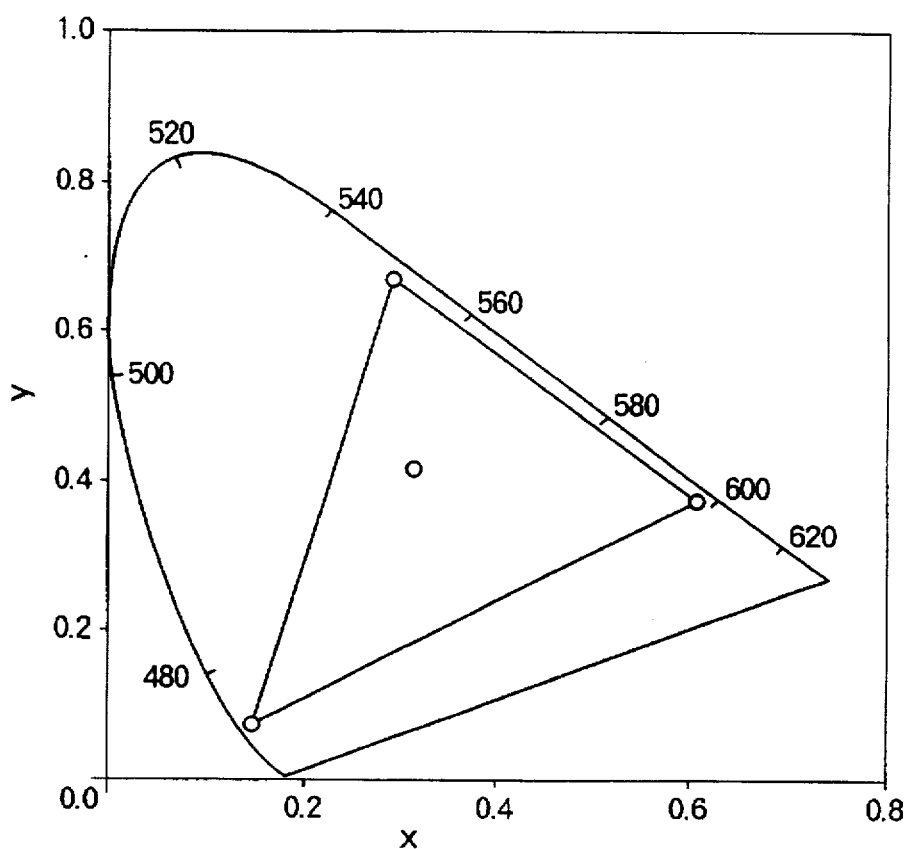
FIG. 8 is the CIE chromaticity of a four-pixel-array interference filter fabricated using the same film structure as that of the delta array.
FIG. 9 is a drawing showing an array method in the case where there are three colors in a line or in a row in the four-pixel array.

A color liquid crystal display using an interference filter according to the present invention is fabricated in the above manner. Moreover, for the color filter arrangement having four pixels as a set, as in the embodiment, and arranging two G pixels in one diagonal direction and two R and B pixels in the other diagonal direction, there are two different array methods: one uses two colors in a line or in a row as shown in FIG. 3 and the other uses three colors in a line or in a row as shown in FIG. 9. However, for the latter one, the uniformity of the density of R and B is insufficient and the B pattern lies adjacent to each other in a diagonal direction. The B pattern which is darker than R and G is seen as connected in the diagonal direction due to this, lowering the B resolution. Therefore, the first method is superior to the second method. Moreover, the first method has an advantage in that the configuration of the external color switching circuit becomes simple because the second method has three (R, G, and B) colors in one line, but the first method has only two colors (G and R or G and B) in one line.

Figure 1:
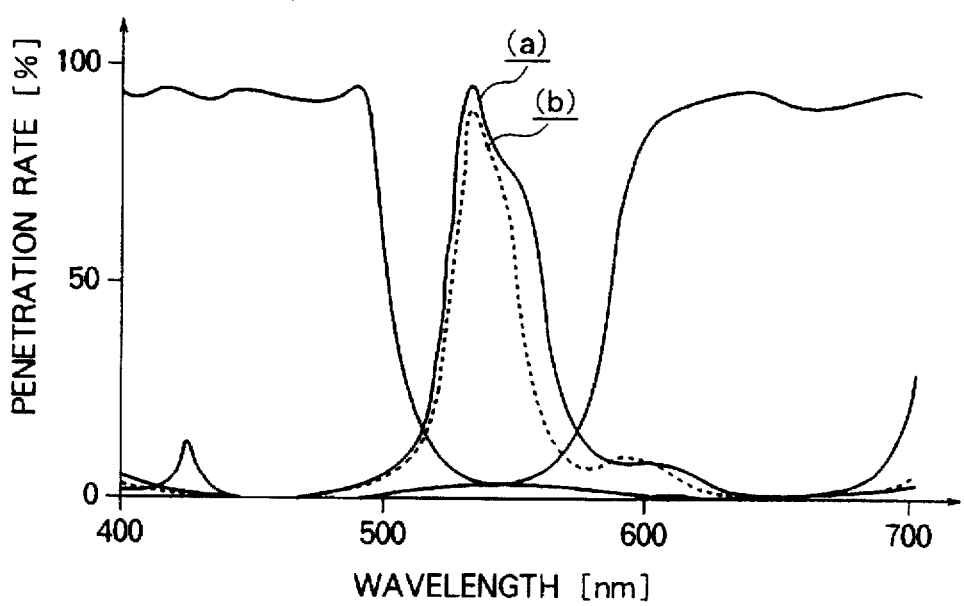
FIG. 1 is a drawing showing the spectral transmission characteristic of each of the R, G, and B filters.
Figure 4:
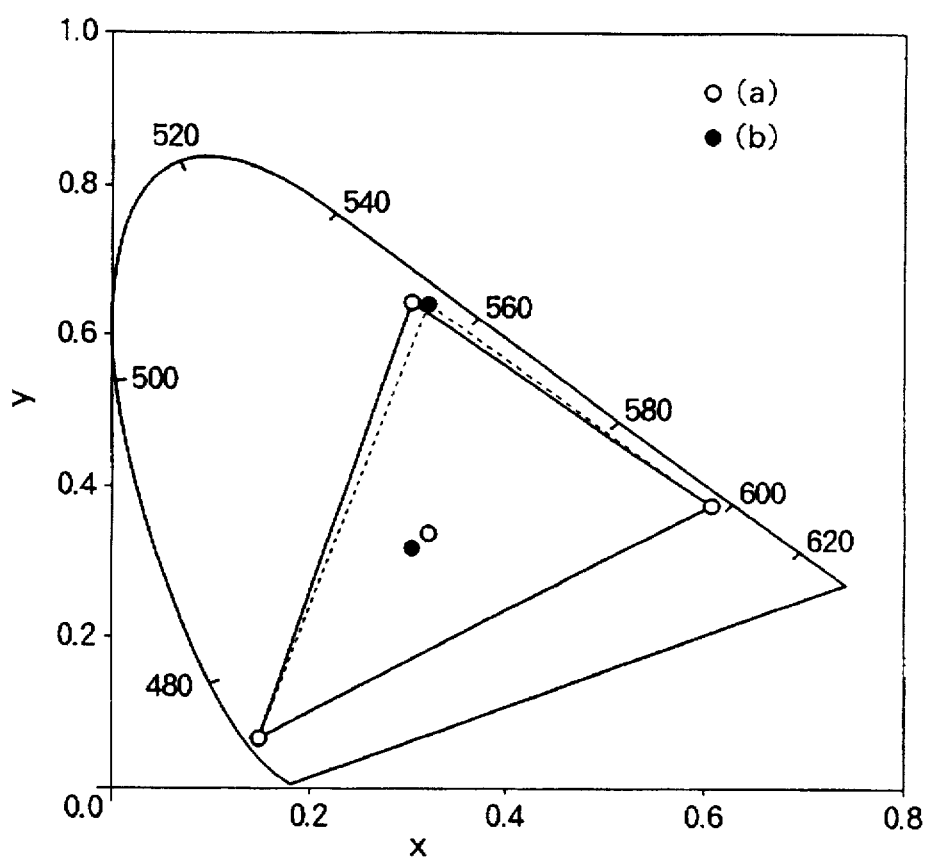
FIG. 4 is the CIE chromaticity of an embodiment of the present invention.
Figure 5:
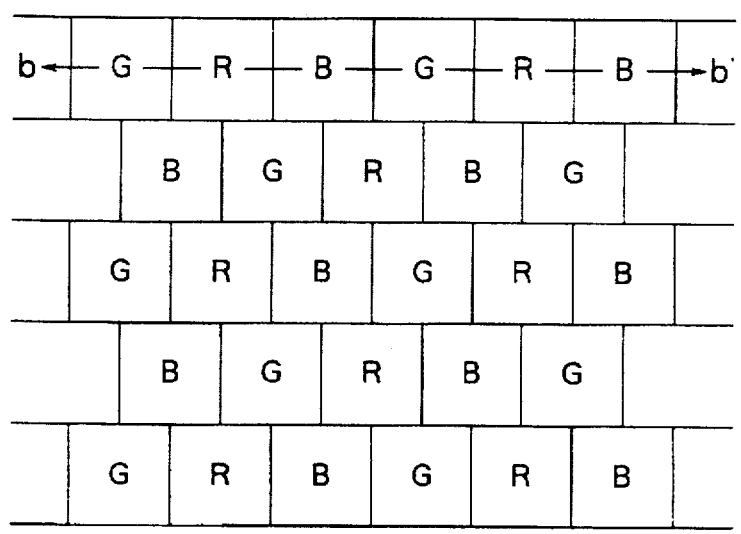
FIG. 5 is a drawing showing a delta array for each of the R, G, and B filters.
Figure 6:
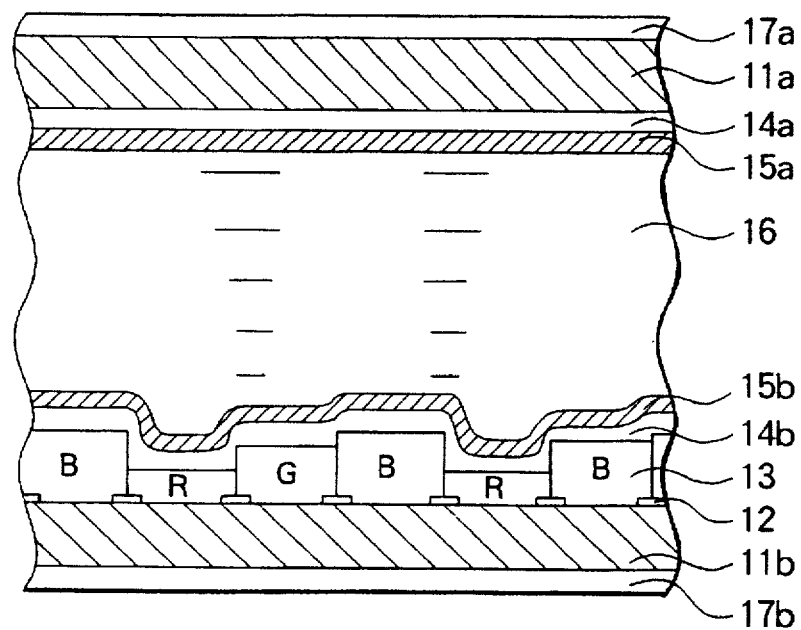
FIG. 6 is a sectional view of a cell of a conventional color liquid crystal display.
Figure 7:
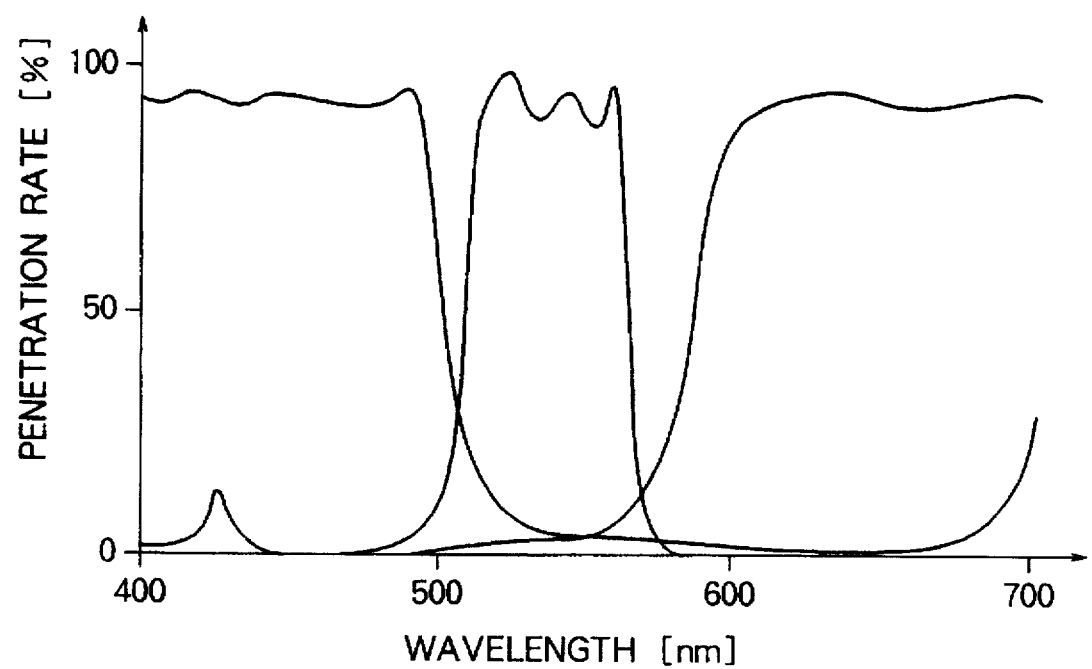
FIG. 7 is a drawing showing the spectral transmission characteristic for each of the conventional R, G, and B filters.

FIGS. 1 and 4 show a spectral transmission characteristic of an interference filter used for the embodiment and the CIE chromaticity. For the spectral transmission characteristic of the G filter, the number of film layers and the film thickness were reduced to narrow the transmission wavelength area. The half-value width of the transparent spectrum of G, which is about 55 nm conventionally (FIG. 7), was reduced to 40 nm or less, thereby enabling a white balance which will not be a problem to be obtained. Furthermore, the reduction of the half-value width to 30 nm or less enables an excellent white balance to be obtained (FIG. 1 (a) and FIG. 4 (a)). Moreover, the difference in stages among the three colors was able to be reduced and stage separation of the transparent conductive film was prevented from occurring (FIG. 1 (b) and FIG. 4 (b)). In addition, the adherence of the orientation film is not made worse. Furthermore, the dΔn value was able to be made a desirable value. In the embodiment, an interference filter is used, but various embodiments can be considered in a similar manner. For example, even in the color filter using a pigment distribution method or a chromosomal method, the white balance can be improved in a similar manner. Even in such color filters, it is assumed that pixels are arranged as shown in FIG. 3. In the case where the half-value width of the transparent spectrum of the G filter is wide and is 40 nm or more, the white balance is pulled to the G side and the liquid crystal cell is colored. Therefore, even in the use of these color filters, a color liquid crystal display which is excellent in color reproducibility 16 can be implemented by lowering the half-value width of the transparent spectrum of the G filter to 40 nm or less or preferably 30 nm or less.

Another embodiment using a similar idea is shown below.

As still another embodiment, it will not lower the difference in stages of the color filter, but the white balance can be controlled by reducing the energy spectrum of the light source itself near G by adding an M (magenta) filter to a lamp used as a backlight or a projection light source. Moreover, the use of this M filter on a color filter in which the half-value width of the transparent spectrum of the G filter is narrowed adjusts the penetration rate of G, thereby enabling the white balance to be improved.

Furthermore, as still another embodiment, a lamp such as a fluorescent lamp, is used as a backlight or a projection light source, for example, and the energy in the transmission wavelength area of the G filter is reduced to about one half, thereby enabling the white balance to be adjusted.

Furthermore, as still another embodiment, in a liquid crystal projector using three monochrome panels, in which the R, G, and B interference filters fabricated in the above method correspond to each of the three panels, the half-value width of the transparent spectrum of the color filter for G is lowered to 40 nm or less or preferably to 30 nm or less, thereby enabling a liquid crystal projector which is excellent in color balance and in color reproducibility to be implemented.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display performing a color display by a color filter composed of multilayer inorganic thin films, comprising:

a color filter having four pixels adjacent to each other as a constituent, said four pixels consisting of two green filters arranged in one diagonal direction and two red and blue filters arranged in the other diagonal direction, and having an array in which either green and red or green and blue filters are arranged alternatively in one line or one row, wherein the half-value width of the transparent spectrum of said green filter is less than approximately 40nm and greater than a value at which white balance begins falling due to reduction of light quantity transmitted through said green filter.

2. A color liquid crystal display according to claim 1, wherein the half-value width of the transparent spectrum of said green filter is less than approximately 30nm.

3. A liquid crystal display performing a color display by a color filter fabricated by either a pigment distribution method or a chromosomal method, comprising:

a color filter having four pixels adjacent to each other as a constituent, said four pixels consisting of two green filters arranged in one diagonal direction and two red and blue filters arranged in the other diagonal direction, and having an array in which either green and red or green and blue filters are arranged alternately in one line or one row, wherein the half-value width of the transparent spectrum of said green filter is less than approximately 40 nm and greater than a value at which white balance begins falling due to reduction of light quantity transmitted through said green filter.

4. A color liquid crystal display according to claim 3, wherein the half-value width of the transparent spectrum of said green filter is less than approximately 30 nm.

5. A projector liquid crystal display, comprising:

a projection light source means;

three monochrome panels; and red, green, and blue filters corresponding to said three monochrome panels, wherein the half-value width of the transparent spectrum of said green filter is less than approximately 40 nm and greater than a value at which white balance begin falling due to reduction of light quantity transmitted through said green filter.

6. A color liquid crystal display according to claim 5, wherein the half-value width of the transparent spectrum of said green filter is less than approximately 30 nm.

7. A color liquid crystal display according to claim 5, wherein said projection light source means is provided with a magenta filter which reduces the energy in the transmission wavelength area to the green filter.

8. A color liquid crystal display according to claim 5, wherein said projection light source means has an emission spectrum in which the energy in the transmission wavelength area to the green filter is almost half the energy in the transmission wavelength area to a filter of another color.

* * * * *